Patented Jan. 28, 1930

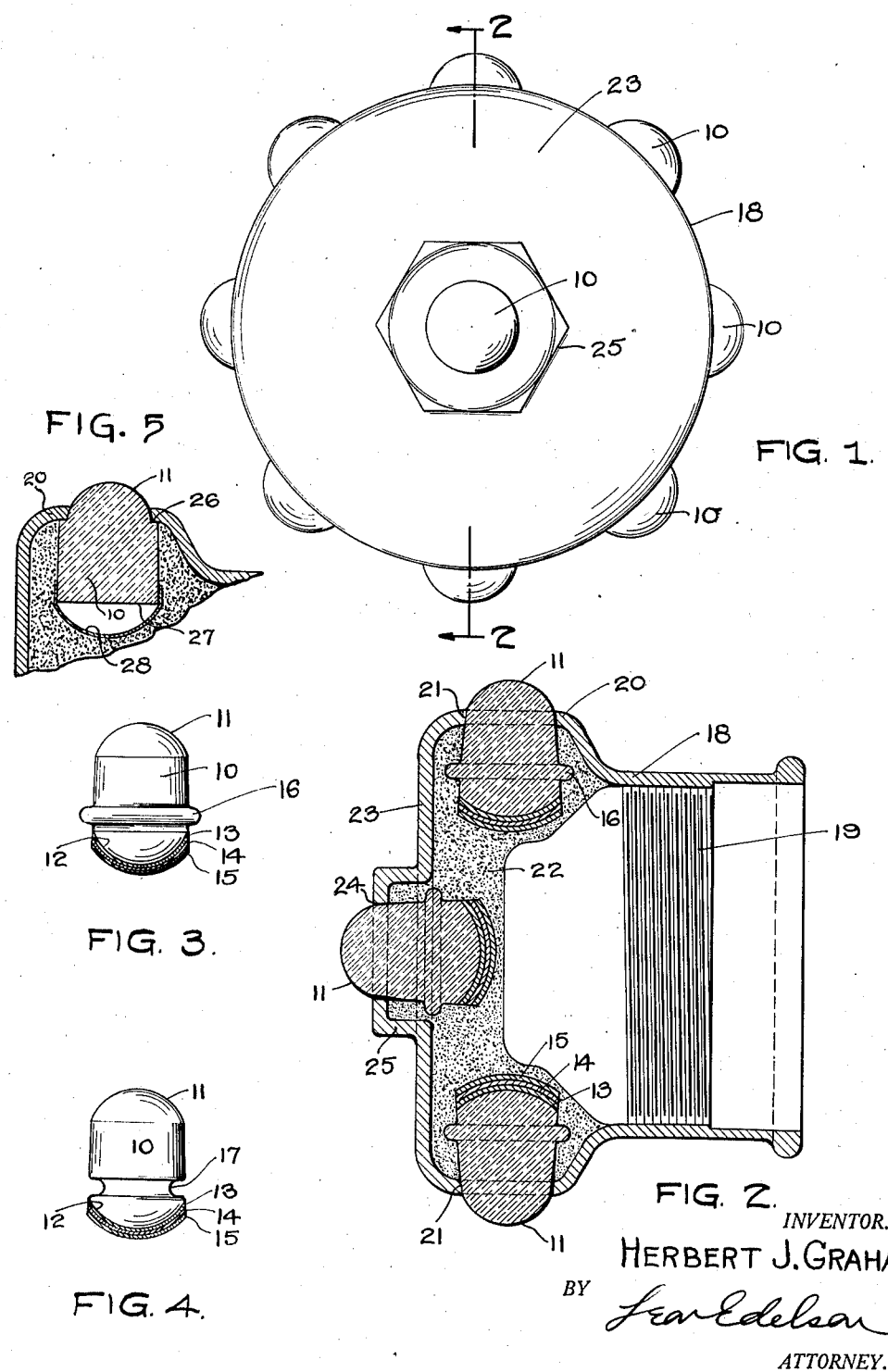

1,745,163

UNITED STATES PATENT OFFICE

HERBERT J. GRAHAM, OF PHILADELPHIA, PENNSYLVANIA, ASSIGNOR TO ELECTRIC SERVICE SUPPLIES COMPANY, OF PHILADELPHIA, PENNSYLVANIA, A CORPORATION OF PENNSYLVANIA

REFLECTOR-EQUIPPED HUB CAP

Application filed September 8, 1928. Serial No. 304,828.

This invention relates to light reflecting devices which at night are illuminated or rendered visible by the reflection of light emanating from an external source and more particularly to vehicles equipped with such devices for enabling the operator of an approaching vehicle to clear with safety the reflector equipped vehicle.

It is only too well known that a great many of automobile accidents which occur at night are directly attributable to the fact that the operator of one of the vehicles is so blinded by the headlights of the approaching vehicle that he is unable to clear the approaching vehicle with safety, the result being that the vehicles either collide or are forced off the road. Were one or both of the vehicles equipped with lights or devices indicating the lateral limits thereof such accidents would be greatly minimized, if not entirely avoided. That this danger has been appreciated is evidenced by the fact that various and sundry expedients have been devised and employed from time to time for obviating this danger, but until this invention none of them have proved entirely satisfactory.

It is accordingly among the primary objects of this invention to equip a vehicle with reflecting devices so that the lateral limits thereof will be clearly indicated to the operator of an approaching vehicle and in consequence of which said operator will be enabled to clear with safety the reflector-equipped vehicle.

A still further object of the invention is the idea of mounting the reflecting devices upon the hub caps of the vehicle. By reason of the fact that these hub caps are normally disposed in the vertical planes which define the lateral limits of the vehicle and toward the ground, the operator of an approaching vehicle is enabled to clear the reflector-equipped vehicle with a maximum assurance of safety.

A still further object of the invention is the provision of a vehicle hub cap about the peripheral surface of which are mounted a plurality of reflecting devices operable to provide, upon rotation of said hub cap, an arcuate band of reflected light surrounding that portion of the cap which is presented toward the source of direct light. There is thus provided a novel signal effect to the operator of an approaching vehicle.

A still further object of the invention is the provision of a reflector-equipped hub cap consisting of a plurality of substantially cylindrical lenses arranged with the axes thereof extending radially about the peripheral surface of the cap, the inner ends of said lenses being provided with suitable reflecting surfaces protected from external injury by the cap itself.

Still another object of the invention is the provision of a vehicle hub cap equipped with a plurality of light reflecting units of a character and permanently mounted therein in such manner that only the outer ends of the units are exposed exteriorly of the cap whereby to insure the units against loss and injury at the same time that the general appearance of the hub cap is considerably enhanced.

Still further, this invention has for its object the provision of a reflector-equipped hub cap which is at all times as dependable as it is highly efficient in use and wherein the utilitarian functions thereof are not interfered with or impaired.

Other objects and advantages of the invention will appear more fully hereinafter.

The invention consists substantially in the combination, construction, arrangement and relative location of parts, all as will appear more fully hereinafter, as shown in the accompanying drawings, and as finally pointed out in the appended claims. In the drawings I have shown two forms of reflecting units, but it will be understood that these are for purposes of illustration only and that other forms may be employed with equal effect and advantage. I have also shown in the drawings a preferred manner of mounting these units in the hub cap, it being understood, however, that other means may be employed for so securing the units in position without departing from the spirit or principles of the invention as defined in the appended claims.

In the said accompanying drawings:

Figure 1 is a frontal elevation of a hub cap constructed in accordance with this invention;

Figure 2 is a vertical section therethrough taken on the line 2—2 of Figure 1;

Figure 3 is an elevational view of one form of reflecting unit, the reflecting surface thereof being shown in cross-section;

Figure 4 is a view similar to that of Figure 3 but illustrating a modified form of reflecting unit, and Figure 5 is a partial section taken on the line 2—2 of Figure 1 showing a modified form of reflecting unit.

Referring to the drawings and more particularly to Figures 3 and 4 which show preferred forms of reflecting units, it will be seen that the unit essentially consists of a transparent lens 10, the body of which is preferably cylindrical and the opposed ends 11 and 12 of which are of generally convex shape. For the purposes of this description and in the appended claims, the convex end 11 of the lens is termed the outer end while the opposite end designated by the numeral 12 is termed the inner end of the lens. Preferably, but not necessarily, the body of the lens is of substantially greater axial length than the radius of either of the convex ends 11 and 12, the axis of the lens body being coincident with the axes of said ends passing through the focal centers thereof.

As clearly appears in Figures 3 and 4, the external surface of the inner end of the lens 10 is treated in any suitable manner to produce a reflecting surface from which rays of light emanating from an external source are reflected through the body of the lens. Preferably, this reflecting surface is produced by initially electrolytically depositing a coating of silver 13 upon the inner convex end of the lens, then a coating of copper 14 and finally a coating of chromium 15. The result is the formation upon the inner end of the lens of a concave reflector which may be considered as a component part of the lens. Obviously, it being within the contemplation of this invention to do so if desired, the reflector may be formed separately from the lens proper for subsequent application to the inner end of the lens which end, in such case, may well be of plano form instead of the convex form shown in Figures 3 and 4. For purposes more apparent hereinafter the lens may be provided with an integrally formed annular bead 16 surrounding the inner portion of the body of the lens (see Fig. 3) or the lens may be provided in said portion of its cylindrical body with an annular groove 17 (see Fig. 4). Of the two forms, that shown in Figure 3 is most preferable for the reason that it provides a greater effective cross sectional area of the lens body through which the direct and reflected light rays may pass. If desired, the bead 16 may be formed as a separate band of any suitable material adapted for securement upon the body of the lens in any suitable manner.

Referring now to Figures 1 and 2, it will be seen that these show a vehicle hub cap 18 equipped with that form of reflecting unit shown in Figure 3. Obviously, any of the other forms of units hereinbefore mentioned may be employed with equal applicability. As shown the hub caps 18 is of generally standard form having a hollow interior with an interiorly threaded end 19 for threaded engagement with the vehicle hub (not shown). Formed in the peripheral surface 20 of the cap toward the outer end thereof are a plurality of openings 21 through each of which is arranged to be outwardly projected a reflecting unit of the form shown in either Figure 3 or Figure 4. In the present instance, the hub cap 18 is shown equipped with units of the form shown in Figure 3.

The reflecting units are so arranged within the hollow interior of the hub cap that only the outer convex ends 11 thereof project beyond the external peripheral surface 20 of the cap, the major portion of the body of each unit and its inner reflecting surface being disposed within the interior of the hub cap. Plastic material 22, such as pitch, cement and the like, is introduced into the interior portion of the hub cap adjacent the outer wall 23 thereof, the inner projecting portions of the reflecting units being embedded in this material. Upon the subsequent hardening of the plastic material, the reflecting units are thus firmly and permanently anchored in position with their axes extending radially about the peripheral surface of the hub cap. The bead 16 greatly facilitates anchoring the units within the plastic material, as does the groove 17 when the form of unit shown in Fig. 4 is employed. Not only does the plastic material 22 serve to securely retain the units in position, but it also serves the very useful purpose of protecting the reflecting surfaces thereof from injury and the deleterious effects of moisture, dirt and the like.

If desired, a suitable opening 24 may be provided in the center of the hub cap wall 23 through which may be projected from the interior of the hub cap the outer end of an auxiliary reflecting unit. This latter unit, the axis of which is substantially coincident with that of the hub cap, is anchored in position in the manner described above. It will be understood that while plastic material adapted for subsequent hardening is herein described as a preferred medium for securing the reflecting units in position, any other means may be employed for the purpose. In connection with the central horizontally disposed reflecting unit, it will be observed that it is so arranged with respect to the wrench or tool engaging portion 25 of the hub cap that the utilitarian function of said portion is neither impaired nor interfered with.

Figure 5 shows a modified form of reflecting unit which may be used, if desired, in place of that shown in Figure 2. In this modified structure the lens 10 is provided with an annular shoulder 26 adjacent its outer convex end 11, this shoulder being adapted to seat against the inner surface of the annular portion 20 of the cap, thereby preventing the lens from being projected exteriorly of the cap beyond a predetermined distance. At the same time, this annular shoulder facilitates the accurate positioning of the lens such that its axis extends perpendicularly with respect to the axis of rotation of the cap. It will further be observed that the reflecting unit shown in Figure 5 employs a lens the inner end of which is of plano form, as at 27, and that instead of electrolytically depositing a reflecting surface upon this end of the lens, as in Figures 3 and 4, a separate reflector 28 is secured thereto. Obviously, this reflector 28 may be dispensed with in favor of a reflecting surface electrodeposited upon the plano end 27 of the lens in the manner described above in connection with the units shown in Figures 3 and 4.

Reflector-equipped hub caps as described above are of decided value and serve the important function of indicating to the operator of an approaching vehicle the lateral limits of the vehicle upon which these hub caps are employed. The light from his own headlights being reflected back to him by the reflector-equipped hub caps of the vehicle which he is approaching enables the operator of the approaching vehicle to clear the same with safety. When the vehicle equipped with the hub caps constructed in accordance with this invention is in motion there is produced a clearly visible arcuate band of reflected light surrounding that portion of each hub cap which is presented toward the source of direct light, this novel effect being caused by the rapid rotation of the radially disposed reflecting units in a substantially vertical plane. On the other hand, when the reflector-equipped vehicle is at rest. the operator of an approaching vehicle can clearly discern the lateral limits of the stationary vehicle by the reflected light rays emanating from one or more of the circumferentially arranged reflecting units. The central horizontally disposed unit serves as an auxiliary warning signal to the operators of vehicles approaching from either side of the reflector-equipped vehicle.

Not only are hub caps constructed in accordance with this invention inexpensive to manufacture, but they are also exceedingly efficient in operation, durable in use and require no radical structural modifications of the standard forms of hub caps now in more or less general use. Furthermore, mounting the reflecting units in position upon the hub cap in the manner hereinbefore described reduces to a minimum their liability of fracture at the same time that it practically eliminates the possibility of their being loosened by reason of shocks or other such vibrations to which the vehicle is subjected. It will be understood, of course, that the invention is susceptible of various changes and that such changes may be made from time to time without departing from the general spirit or principles of the invention. It is accordingly intended to claim the invention broadly, as well as specifically, as indicated by the appended claims.

What is claimed as new and useful is:

1. A hub cap of the character described provided with a plurality of light reflecting units spaced about the external peripheral surface of the cap, said units each including a substantially cylindrical lens the axis of which extends radially from the axis of rotation of the cap.

2. A hub cap of the character described having a hollow interior, a plurality of lenses spaced about the peripheral surface of the cap with the outer ends thereof projecting exteriorly of the cap, and reflector means operatively associated with the inner ends of said lenses, said reflector means being disposed within the hollow interior of said cap.

3. A hub cap of the character described having a hollow interior, a plurality of lenses spaced about the periphery of the cap with the outer ends thereof projecting exteriorly of said cap, reflector means operatively associated with the inner end of said lenses, said reflector means being disposed within said hollow interior, and means operative to retain said lenses and their respective reflector means permanently in position.

4. A hub cap of the character described having a hollow interior, a plurality of substantially cylindrical lenses projected radially through the peripheral surface of the cap, said lenses being each provided with a convex end projecting exteriorly of said hollow interior and with a concave reflecting surface disposed within said interior, and plastic material in said hollow interior within which the reflector ends of said lenses are embedded whereby the lenses are retained permanently in position.

5. The combination with a hub cap having a hollow interior, of a plurality of light reflecting units spaced circumferentially about the peripheral surface of the cap, each of said units including a lens having a convex outer end and a reflecting surface upon its inner end, and means for retaining said units in position with only said convex outer ends thereof projecting exteriorly of the hollow interior of the cap.

6. The combination with a hollow hub cap, of a plurality of circumferentially spaced reflecting units projecting radially through the annular wall of the cap, plastic material inserted in the hollow interior of said cap, the inner ends of said units being embedded in said material, and means operative to effectually preclude displacement of said units from said plastic material.

In testimony whereof, I have hereunto affixed my signature.

HERBERT J. GRAHAM.